US006956893B2

(12) United States Patent
Frank et al.

(10) Patent No.: US 6,956,893 B2
(45) Date of Patent: Oct. 18, 2005

(54) LINEAR MINIMUM MEAN SQUARE ERROR EQUALIZATION WITH INTERFERENCE CANCELLATION FOR MOBILE COMMUNICATION FORWARD LINKS UTILIZING ORTHOGONAL CODES COVERED BY LONG PSEUDORANDOM SPREADING CODES

(75) Inventors: Colin D. Frank, Lombard, IL (US); Eugene Visotsky, Skokie, IL (US); Prashant Choudhary, Schaumburg, IL (US); Amitava Ghosh, Buffalo Grove, IL (US)

(73) Assignee: Motorola, Inc., Schaumburg, IL (US)

( * ) Notice: Subject to any disclaimer, the term of this patent is extended or adjusted under 35 U.S.C. 154(b) by 755 days.

(21) Appl. No.: 09/933,365

(22) Filed: Aug. 20, 2001

(65) Prior Publication Data

US 2003/0035469 A1    Feb. 20, 2003

(51) Int. Cl.⁷ .............................................. H04K 1/00
(52) U.S. Cl. ...................... 375/147; 375/232; 375/346
(58) Field of Search .............................. 375/140, 148, 375/142–144, 150, 152, 130, 147, 340, 350, 375/343, 231, 232; 370/342, 343, 441, 479, 370/335, 320, 350; 455/67.3, 63; 708/300, 708/320, 322, 323

(56) References Cited

U.S. PATENT DOCUMENTS

| | | | | |
|---|---|---|---|---|
| 6,377,611 B1 * | 4/2002 | Hwang | .................. | 370/342 |
| 6,426,973 B1 * | 7/2002 | Madhow et al. | ............ | 375/231 |
| 6,445,692 B1 * | 9/2002 | Tsatsanis | ................ | 370/342 |
| 6,570,863 B1 * | 5/2003 | Kim et al. | ................. | 370/342 |
| 6,570,864 B1 * | 5/2003 | Kim et al. | ................. | 370/342 |
| 6,700,923 B1 * | 3/2004 | Dowling et al. | ............ | 375/148 |
| 6,782,036 B1 * | 8/2004 | Dowling et al. | ............ | 375/130 |

OTHER PUBLICATIONS

Adaptive MMSE receivers for comm. in non-stationary multipath fading channel□□Fantacci, R et al; Spread Spectrum Techniques & Applications, 2000 IEEE Sixth International Symposium , vol.: 2 , Sep. 6-8, 2000;pp.: 545-549.*
LMMSE detection for DS-CDMA systems in fading channels□□Latva-Aho, M.; Juntti, M.J.;□□Communications, IEEE Transactions on , vol.: 48, Issue: 2, Feb. 2000 □□pp.: 194-199□□.*

(Continued)

*Primary Examiner*—Jay K. Patel
*Assistant Examiner*—Jacob Meek
(74) *Attorney, Agent, or Firm*—Lalita W. Pace

(57) ABSTRACT

The present invention provides linear MMSE equalization with parallel interference cancellation for symbol determination in a forward link of a CDMA communication system which has a plurality of code channels in use. Use of the linear MMSE equalization with parallel interference cancellation of the present invention provides significantly increased performance. The preferred method linearly filters a received signal to form a first filtered signal (410), despreads and demodulates the first filtered signal (415, 420) and provides a plurality of symbol estimates for all corresponding code channels (430). An estimated transmitted signal is generated from the plurality of symbol estimates (435), and with a channel estimate (405), an estimated received signal is generated (440). A residual signal is determined as a difference between the received signal and the estimated received signal, is linearly filtered (445), and then combined with the estimated transmitted signal to form a next, enhanced estimated transmitted signal (450). This next estimated transmitted signal is despread (455, 460) and utilized to provide a next plurality of symbol estimates, for a selected code channel of the plurality of channels, for subsequent use in error correction and decoding, and further use by a subscriber (465, 475).

40 Claims, 5 Drawing Sheets

OTHER PUBLICATIONS

MMSE Interference suppression for coded multicarrier DS-CDMA in the presence of intermodulation  Weiping Xu; Milstein, L.B.;  Wireless Communications and Networking Conference, 1999. WCNC. 1999 IEEE , Sep. 21-24, 1999   pp.: 85-89 vol. 1  .*

* cited by examiner

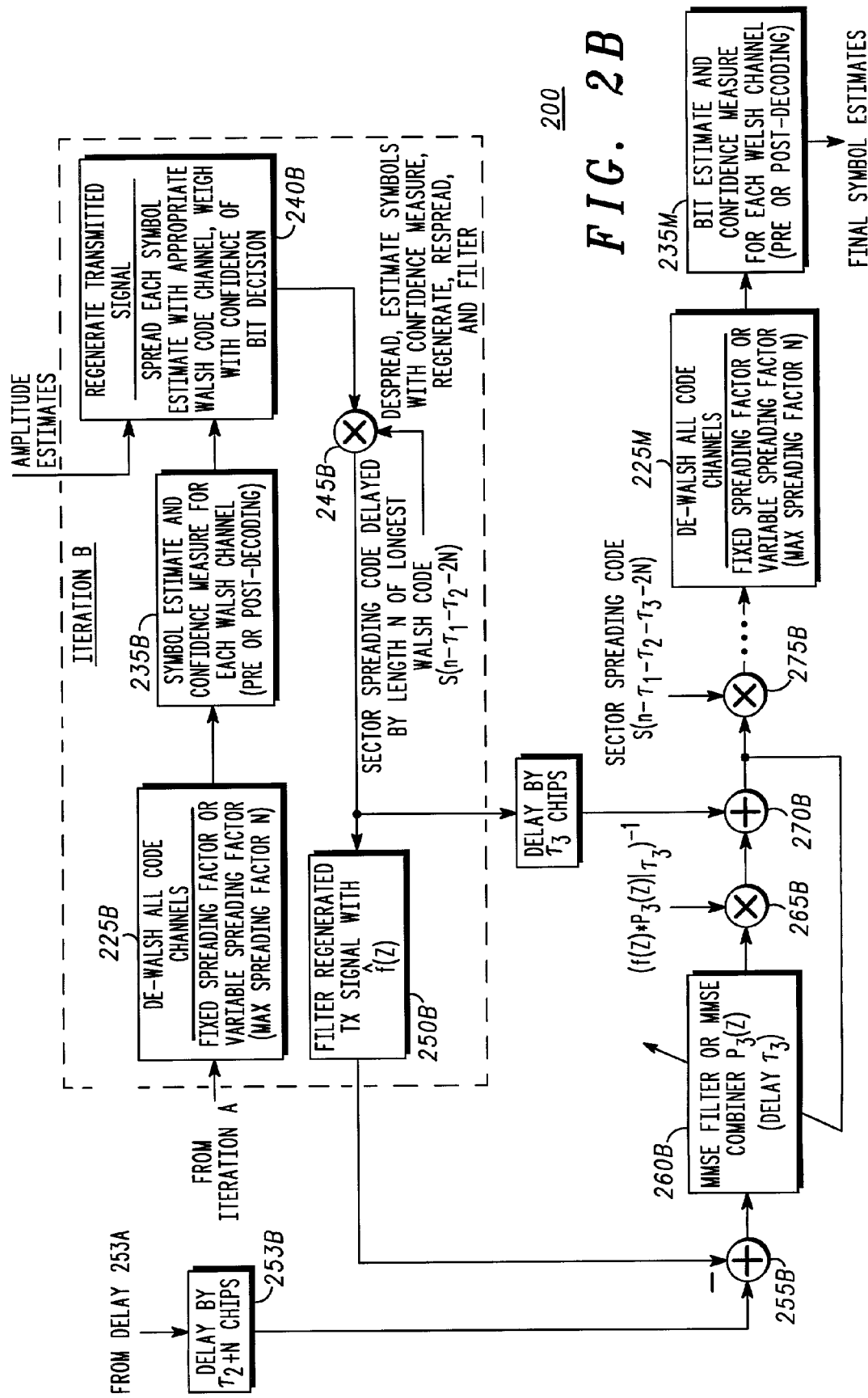

LINEAR MINIMUM MEAN SQUARE ERROR EQUALIZATION WITH INTERFERENCE CANCELLATION FOR MOBILE COMMUNICATION FORWARD LINKS UTILIZING ORTHOGONAL CODES COVERED BY LONG PSEUDORANDOM SPREADING CODES

FIELD OF THE INVENTION

The present invention relates, in general, to receivers for code division multiple access (CDMA) communication systems, and more particularly, to receivers having linear, minimum mean square error equalization with successive or parallel interference cancellation for mobile communication forward links utilizing orthogonal codes covered by long pseudorandom spreading or scrambling codes, for utilization in, for example, mobile stations for CDMA, cdma2000, W-CDMA, or any other direct-sequence spread spectrum communication systems.

BACKGROUND OF THE INVENTION

Code Division Multiple Access ("CDMA"), cdma2000, 3GPP, and W-CDMA mobile communication systems are increasingly deployed (or planned to be deployed) to accommodate increasing usage levels of mobile communication technologies. Within these communication systems, and more particularly within mobile stations (or mobile units, such as CDMA mobile telephones or multimedia devices), a "rake" receiver is currently employed for multipath reception.

A rake receiver typically includes a tapped delay line, a plurality of "rake fingers", and a conjugate gain or maximal ratio combiner, for this multipath reception. The various rake fingers include correlators to despread a received signal with a selected or assigned Walsh code, and are followed by a conjugate gain or maximal ratio combiner or other filter to generate the desired signal for the user.

Rake receivers have typically been utilized, among other reasons, for their low complexity and robustness to channel measurement error. Rake receivers, however, are not optimal in terms of performance. For example, other types of filter arrangements, such as filters which invert the multipath channel between transmitter and receiver, may excessively enhance additive noise in the channel and are sensitive to and degraded by channel measurement error.

Minimum mean square error ("MMSE") filtering or other linear feedforward equalization has generally not been employed for CDMA reception. More particularly, MMSE or other linear equalization is typically applied only to communication links having a single-user plus noise in the channel, and in which the signaling waveform is not time varying. In contrast, a CDMA, cdma2000 or W-CDMA channel has multiple users plus noise in the channel; users are separated by codes spanning "N" chips; and the codes (waveforms) change from one symbol to the next due to covering by the long pseudorandom (sector) spreading or scrambling code. For higher-order signaling constellations which require more power, rake receivers are not suitable as they have an error floor and multipath channels due to intra-cell interference.

Implementations of CDMA and of proposed technologies such as cdma2000 and wideband CDMA (W-CDMA or 3GPP) may be optimized, however, with the use of receiver structures other than rake receivers. As a consequence, a need remains for a receiver structure which may be utilized with CDMA technologies, including cdma2000, 3GPP and W-CDMA, which provides improved performance and increased system capacity. In addition, such a receiver should also be compatible with existing communications systems and be capable of cost-effective implementation.

SUMMARY OF THE INVENTION

The present invention provides linear MMSE equalization with parallel interference cancellation for symbol determination, preferably in a forward link of a CDMA communication system which has a plurality of code channels in use. Use of the linear MMSE equalization with parallel interference cancellation of the present invention provides significantly improved performance. Utilizing the present invention, base station transceivers may transmit using significantly lower power allocations, increasing the number of users who may be served and increasing the amount of data which may be transmitted for existing users.

The preferred method embodiment first equalizes a received signal, using minimum mean square error equalization (or, equivalently, using a MMSE combiner with unevenly spaced taps), to form a first filtered signal. The first filtered signal is despread and demodulated, and used to determine a plurality of symbol estimates (or "soft" decisions) for all corresponding code channels of the plurality of code channels. In the preferred embodiment, an amplitude estimate for all corresponding channels of the plurality of channels and a confidence measure for each symbol estimate of the plurality of symbol estimates are also determined.

To provide parallel or successive interference cancellation, the present invention then generates an estimated transmitted signal from the plurality of symbol estimates, by weighting each symbol estimate by its corresponding confidence measure to form a plurality of weighted symbols, and spreading the plurality of weighted symbols using a corresponding plurality of orthogonal codes, a corresponding plurality of amplitude estimates, and a sector spreading or scrambling code. Next, the an estimated received signal is generated from the estimated transmitted signal and a channel estimate, where the channel estimate was previously determined by correlation of the received signal with a known pilot signal. For interference cancellation, the preferred embodiments produce a residual signal as a difference between the received signal and the estimated received signal, and then equalize the residual signal, using minimum mean square error equalization, to form a second filtered signal.

Because the interference cancellation also removes the selected or desired signal, the second filtered signal is then combined with the estimated transmitted signal to form a next, enhanced estimated transmitted signal. This next estimated transmitted signal is then despread and utilized to provide a next plurality of symbol estimates (or soft decisions) for a selected code channel of the plurality of code channels. These symbol estimates are then passed to a forward error correction decoder (corresponding to an encoder used in the transmitter, such as a turbo decoder, a convolutional decoder, etc.), and may then be utilized by the communication device, such as to provide audio or provide data to the subscriber. Alternatively, these symbol estimates may then be used for repeated iterations of the methodology, until a desired level of accuracy is achieved.

Numerous other advantages and features of the present invention will become readily apparent from the following

DETAILED DESCRIPTION OF THE INVENTION

Figure 1:
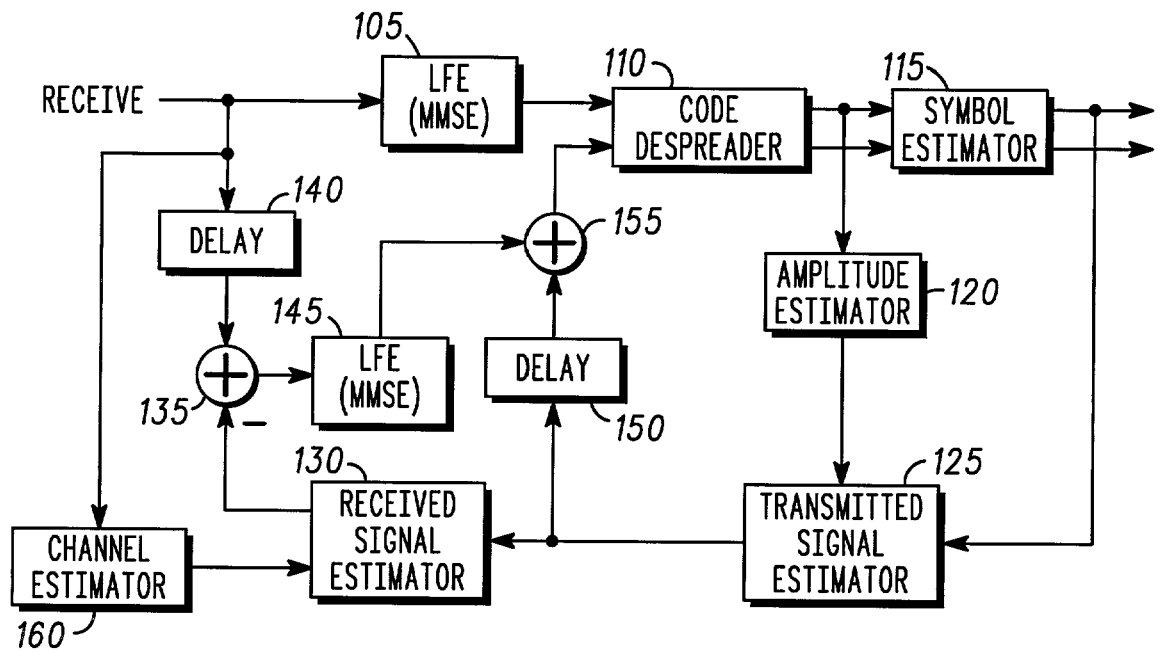
FIG. 1 is a block diagram illustrating a preferred receiver structure for MMSE equalization with parallel interference cancellation in accordance with the present invention.

While the present invention is susceptible of embodiment in many different forms, there are shown in the drawings and will be described herein in detail specific embodiments thereof, with the understanding that the present disclosure is to be considered as an exemplification of the principles of the invention and is not intended to limit the invention to the specific embodiments illustrated.

As discussed in greater detail below, the present invention provides an optimal linear MMSE equalizer with parallel (multiple access) interference cancellation, preferably for use in the forward link (from base station transceiver to mobile station) in communication systems utilizing orthogonal codes, such as Walsh codes, covered by a common, long pseudorandom spreading or scrambling code, such as the various CDMA systems mentioned above. Initial or tentative symbol estimates are made following linear MMSE equalization. These initial or tentative symbol estimates are then utilized, in an iterative fashion, to remove multiple access interference corresponding to the initial symbol estimates, and then to make new symbol estimates following the removal of the multiple access interference.

FIG. 1 is a block diagram illustrating a preferred receiver 100 for MMSE equalization with parallel interference cancellation in accordance with the present invention. A received signal, such as a CDMA signal received by a mobile station, is input into a linear feedforward equalizer ("LFE") 105, which is preferably implemented as a minimum mean square error (MMSE) equalizer or combiner, to reduce inter-chip interference. In the preferred embodiment, the error being minimized through adaptation of filter coefficients (in both LFE 105 and 145) is formed from a correlation of the received signal with a known pilot signal. (The LFE 105 (or 145) which minimizes the mean square error using this pilot estimate equivalently yields an estimate of the transmitted signal which has minimum mean square error relative to an actual transmitted signal).

The equalized received signal is then input into code despreader 110, which removes or despreads the filtered signal using a pseudorandom or sector spreading code (or, equivalently, a scrambling code), and using a plurality of orthogonal (Walsh) codes, preferably for all channel codes in use (i.e., for all users or all logical channels in use). The despread and demodulated signal is then input into symbol estimator 115, which produces an output stream consisting of symbol estimates or (soft) symbol decisions, for further use in a communication device, such as for decoding and ultimately to provide audio or data to the user. In the preferred embodiment, the despread and demodulated signal is also input into an amplitude estimator 120, which provides an amplitude estimate for each orthogonal (Walsh) channel, for use in forming an estimated transmitted signal, discussed below.

The output symbol estimates are also utilized for parallel interference cancellation. The output symbol estimates are input into a transmitted signal estimator 125 which, first, weights each estimated symbol utilizing the amplitude estimates from block 120 and utilizing any selected confidence weighting (discussed in greater detail below), and second, respreads each weighted symbol with all orthogonal (Walsh) codes (currently in use), sums the result, and respreads with the sector (pseudorandom) spreading code, to produce an estimated transmitted signal. A channel estimate is formed in channel estimator 160, by correlation of the received (pilot) signal with a known pilot signal, and provided to the received signal estimator 130. Using the channel estimate, the received signal estimator 130 filters the estimated transmitted signal to produce an estimated received signal. For parallel interference cancellation, the estimated received signal is subtracted from the actual received signal (with an appropriate delay, from delay block 140) in summer 135, to produce a residual signal having residual inter-chip interference and having a residual signal from the serving base station.

The residual signal from summer 135 is input into a second LFE 145, which is also preferably implemented as a MMSE equalizer or as a matched filter. In the preferred embodiment, the error being minimized through adaptation of filter coefficients in LFE 145 (as with LFE 105) preferably is formed from a correlation of the pilot signal portion of the received signal with a known pilot signal. In addition to removing multiple access interference, because the subtraction of the estimated received signal from the actual received signal has also removed the desired signal, the filtered residual signal output of second LFE 145 is combined, in combiner 155, with the estimated transmitted signal (from block 125) (with an appropriate delay, from delay block 150), to produce a second, or next, enhanced estimate of the transmitted signal. This second estimated transmitted signal is then input into code despreader 110, followed by the symbol estimator 115. The output of symbol estimator 115 may then be input again into transmitted signal estimator 125 for additional iterations, or may be output as symbol estimates or (soft) decisions, for further use, as mentioned above.

To observe the parallel interference cancellation (or, equivalently, multiple access interference cancellation), it should be noted that the estimated transmitted signal (from block 125) is used to remove such multiple access interference from the symbol estimates (block 115). More specifically, the estimated transmitted signal, once filtered using the channel estimate (block 130), is subtracted from the (actual) received signal (combiner 135), removing the multiple access interference.

Following despreading and symbol estimating in blocks 110 and 115, this process may be repeated (iterated), for a selected or preferred level of accuracy. In the current embodiment, no additional iterations are implemented, with symbol estimates or decisions utilized following the second despreading and symbol decision operations. The various LFEs 105 and 145 may be implemented in a plurality of ways, as discussed in greater detail below. In the preferred embodiment, for example, LFEs 105 and 145 may be implemented adaptively, based on an error signal determined from a pilot signal transmitted from a serving base station, as mentioned above. The filters 105 and 145 may also be computed directly using the channel estimate and an estimate of signal geometry (a ratio of intra-cell interference to other cell interference as measured at the subscriber), or may be computed using an estimate of the correlation matrix of the received signal along with a channel mean. Least mean square or other RLS adaptive implementation may also be used for LFEs 105 and 145. In the preferred embodiment, LFEs 105 and 145 are implemented as multiple stage Weiner filters. Alternatively, in order to reduce complexity, a matched filter may be used for filter 145, but performance will be degraded. In addition, the various LFEs 105 and 145 may be implemented using irregularly spaced filter taps (rather than chip spaced) so that the filters are compatible with existing and traditional Rake architectures. In this instance, the LFEs 105 and 145 combine the rake fingers so as to minimize mean square error of the resulting signal estimate.

A significant feature of the present invention is the despreading and respreading of all code channels of the plurality of channels in use from the serving base station, not merely the selected channel or channels of the particular user or subscriber. While computationally intensive, such despreading and respreading of all available code channels, with the interference cancellation of the present invention, provides substantially improved performance in the reception of the desired signal on the selected channel, and is compatible with the use of multiple channels by the same subscriber.

Figure 2A:
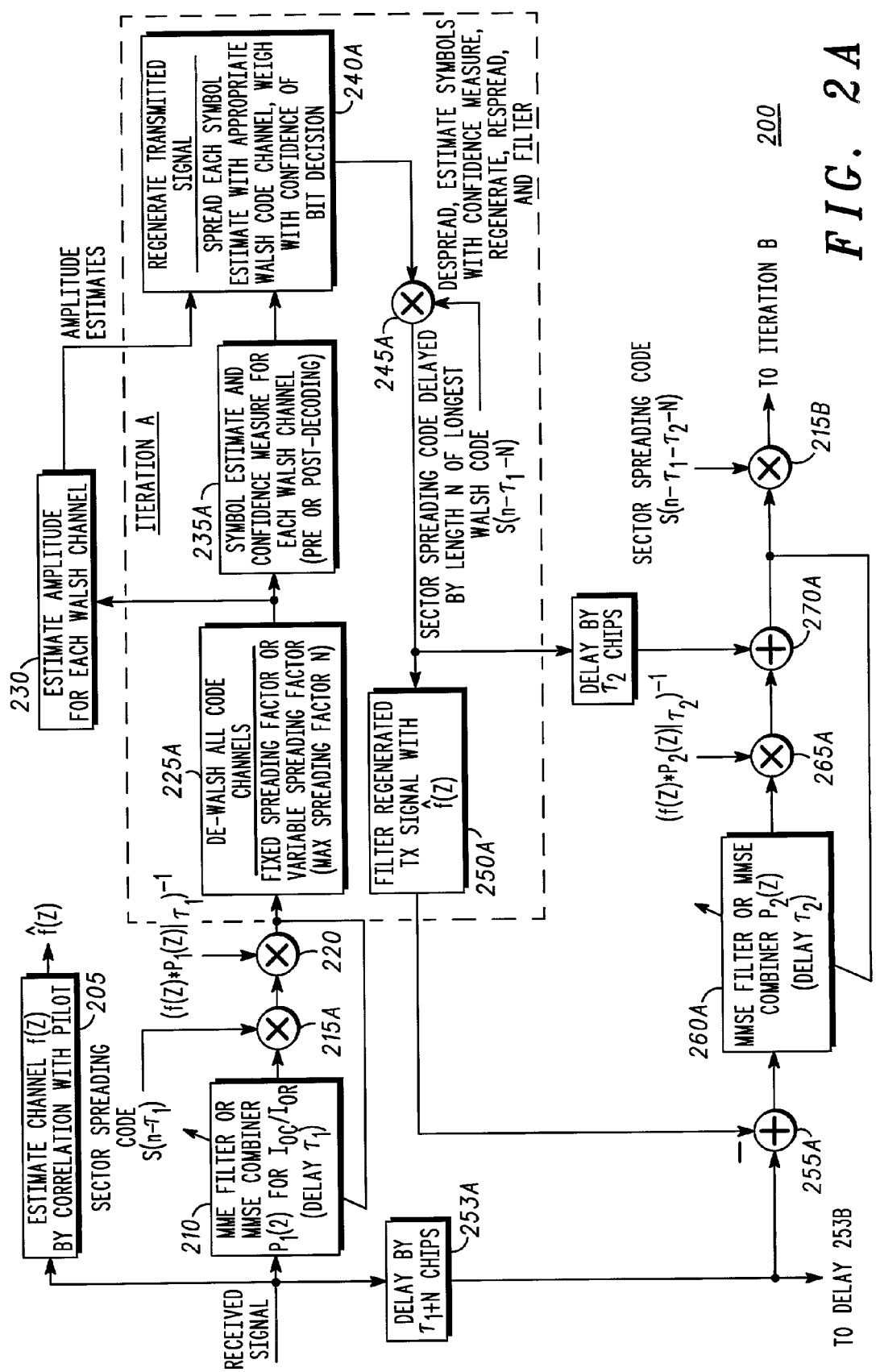
FIG. 2 (divided into FIGS. 2A and 2B) is a combined block and flow diagram illustrating, in greater detail, a preferred receiver structure and method for MMSE equalization with parallel interference cancellation in accordance with the present invention.

FIG. 2 is a combined block and flow diagram illustrating, in greater detail, a preferred receiver 200 structure and method for MMSE equalization with parallel interference cancellation in accordance with the present invention. As mentioned above, a channel estimation is performed (block 205), preferably by correlation with a transmitted pilot signal, for subsequent use in forming an estimated received signal.

The received signal is initially filtered, in the first linear (MMSE) equalizer 210, which may be implemented as a MMSE filter or MMSE combiner. This first linear (MMSE) equalizer 210 can be implemented at the chip rate, prior to despreading, or equivalently, it can be implemented as an MMSE combiner which operates on a vector output of Rake despreaders for each of the code channels. The first linear (MMSE) equalizer 210 may be implemented as a chip or sub-chip spaced equalizer. In addition, the first linear (MMSE) equalizer 210 or combiner may alternatively have regularly spaced taps or may have irregularly spaced taps, where the latter alternative is compatible with existing Rake control algorithms for assigning and tracking rake fingers.

The first linear (MMSE) equalizer 210 may be implemented in a variety of ways, as discussed above with reference to LFE 105. First, the first linear (MMSE) equalizer 210 may be implemented by direct calculation, such as by using an estimate of the channel impulse response and the signal (or channel) geometry, or by estimating the correlation matrix of the received signal and the channel mean. The correlation matrix can be estimated directly from the received signal, while the channel impulse response can be estimated by correlation of the received signal with the pilot code and/or pilot symbols. The first linear (MMSE) equalizer 210 may also be implemented adaptively from the pilot code and/or pilot symbols by using either LMS or RLS estimation, or adaptively using a multi-stage Wiener filter (as in the preferred embodiment).

As illustrated in FIG. 2, the first linear (MMSE) equalizer 210 is implemented at the chip rate. The equalized signal is then despread (block 215 (multiplier)) with the long spreading or scrambling code assigned to a given or selected sector of the base station (with which the mobile station is currently in communication), and preferably scaled (multiplication block 220) with a gain adjustment. Error is measured following block 220, for adaptation of first linear MMSE equalizer 210, as illustrated. This equalized, despread (and scaled) signal is then correlated with each of the orthogonal (Walsh) codes or, equivalently, with any other set of channelization codes, block 225A. (As used herein, references such as A, B or M, following a numeric reference such as 225, are utilized to refer to an iteration, with orthogonal correlation block 225, for example, used repeatedly for iteration A, B, and so on, through iteration M). In the preferred embodiment, this correlation or filtering is performed for all orthogonal (Walsh) codes available or in use in the sector, i.e., a bank of Walsh correlators is implemented to despread all symbols from all users.

To provide appropriate transmitted signal reconstruction, amplitude estimates are made for each of the code channels following despreading, in block 230. In some systems, such as 1Xtreme in 3GPP2 or HSDPA in 3GPP, the amplitudes of some code channels, such as those assigned to the shared data or packet channel, have a known amplitude relative to the pilot channel. The amplitude of the pilot channel may be accurately measured by correlating the known pilot signal with the received signal. The amplitude of any code channel which does not have a fixed relationship relative to the pilot channel can be estimated by averaging (or low-pass filtering) the amplitudes of the outputs of the correlator for the corresponding code channel (from block 225A). A correction should be applied to such estimates since they are positively biased. Amplitude estimates of code channels whose presence is not known a priori to the subscriber (mobile station) can be formed by averaging (or low pass filtering) the amplitudes of the outputs of the correlators for these code channels (block 225A). If the average exceeds a given threshold relative to the strength of the pilot code, the channel is assumed to be present. The ratio of the pilot to the code channel power can also be explicitly signaled using a forward link signaling channel.

Symbol estimates or decisions are then performed in block 235A from the orthogonally despread signal. In order to make symbol estimates in block 235A, the symbol constellation for the given code channel must be either known or estimated. For many code channels, the symbol constellation may be known. For example, in 1Xtreme in 3GPP2 or HSDPA in 3GPP, the symbol constellations of the code channels assigned to the shared data channel or the packet channel are known. For IS-95A/B, cdma2000, and W-CDMA, the code channels assigned to voice users employ either BPSK or QPSK. Thus, the symbol constellation for code channels assigned to voice users will be known.

Symbol estimates can be made in one in of several ways. In the first method, hard decisions are made on the output of the correlators for the given code channels (block 225A). Alternatively, the frame, or a portion of the frame can be buffered and decoded. In this case, the symbol estimates are the output of the decoder. A combination of the two methods can also be used—that is, for some code channels the symbol estimates can be made by decoding, while for other code channels, the symbol estimates are the result of hard decisions made on correlator output for the given code channel.

In the preferred embodiment, within block 235A, a reliability or confidence measure is associated with each symbol estimate of each code channel. The reliability measure lies in the closed interval [0,1], where the measure 0 is associated with a completely unreliable symbol estimate, and the measure 1 denotes absolute certainty. For a given code channel, all symbol estimates may be assigned the same reliability, or alternatively, the reliability measure may be assigned on a symbol-by-symbol basis.

Reliability measures for symbol estimates can be assigned in several ways, for example: (1) the Euclidean distance between the given symbol estimate and the output of the correlator for the code channel; (2) the relationship between the amplitude estimate for the given code channel, and the size of the symbol constellation (such as the ratio of amplitude estimate squared to the base-2 log of the size of the symbol constellation); and (3) the decoding algorithm can assign reliability measures to the channel symbols. Decoders for all types of codes (block, convolutional, trellis, and turbo) can be designed to yield reliability estimates for each of the channel symbols. The SOVA algorithm (soft-output Viterbi algorithm) is one such algorithm for trellis codes. Turbo decoders always yield reliability information for the code symbols.

In some cases, the reliability of the symbols may be assigned a priori as a function of the code channel type (voice or data) and as a function of the iteration number. For example, code channels assigned to a shared data channel or a packet channel may all be assigned a reliability of 0.4 on the first iteration (A), 0.6 on the second iteration (B), and 0.8 on the third iteration (C), and so on, through the $M^{th}$ iteration.

Next, in block 240A, an estimate of the transmitted signal is formed. In the preferred embodiment, each symbol estimate is multiplied by the corresponding reliability measure, and the result is used to modulate the corresponding code channel. The modulated code channels are then summed and multiplied by the sector spreading code (or, equivalently, a scrambling code) (block 245B), regenerating or producing the estimated transmitted signal.

As mentioned above, the regenerated, estimated transmitted signal is used to remove multiple-access interference from the symbol estimates. The estimated transmitted signal is filtered by the channel estimate, in block 250A, and subtracted in block 255A from the delayed received signal (block 253A), to form the residual signal. Because in removing the multiple access interference, the desired signal is also removed, the estimated transmitted signal is added back in (block 270A) to the residual signal after the second MMSE equalization of block 260A.

In the preferred embodiment, the second MMSE equalization of block 260A (for a specified position and length) is a function of three elements: (1) the channel f(z) between the serving sector and the subscriber; (2) the ratio of other-cell power to serving cell power, as measured at the subscriber; and (3) the covariance of the other-cell interference. Error is measured following block 270A, for adaptation of second linear MMSE equalizer 260A, as illustrated.

Because desired signal energy has been subtracted out in forming the residual signal, in general, the second MMSE equalization of block 260A will generally have different coefficients than the first MMSE equalization of block 210. More specifically, subtraction of the estimated received signal (the estimated transmitted signal with channel filtering) from actual received signal changes the geometry of the resulting, residual signal, with "geometry", as used herein, referring to the ratio of the signal from the serving base station to the signals from other, interfering base station, with additive noise. Thus, the MMSE estimate of the residual signal (the difference between the transmitted signal and the estimated transmitted signal) is formed by filtering the difference between the received signal and the estimated received signal with the second MMSE equalizer corresponding to the new geometry.

The regenerated, estimated transmitted signal from the prior stage is added to the scaled (block 265A) output of the second MMSE equalization of block 260A. Preferably, most of the entire process is now repeated, illustrated as iteration B in FIG. 2, until the desired reliability is achieved for the code channel or channels of interest, or until an iteration limit is reached.

The receiver 100 and 200 structures illustrated in FIGS. 1 and 2 may be operated in a variety of ways. The receivers 100 and 200 may be implemented in a successive interference cancellation mode. In this mode, a single user channel may be estimated, regenerated, and subtracted from the received signal during each iteration. This successive interference cancellation generally removes multiple access interference from code channels in the order of strongest to weakest, or most to least reliable.

For subscribers using the shared channel or packet channel, the code channels assigned to this channel are typically equally reliable. Thus, for these code channels, the best mode of operation may be a parallel mode in which all of the code channels assigned to the shared or packet channel are assigned equal reliability. Data or voice users having power exceeding that of the shared or packet code channels may be regenerated and subtracted sequentially or jointly from the received signal, prior to the implementation of parallel mode of operation for the shared data or packet channel.

For a given symbol interval, the interference cancellation iterations of the present invention may be stopped whenever the code channels of interest meet or exceed a given level of reliability, or when an iteration limit has been exceeded.

Other variations of the receiver 100 and 200 structures are also within the scope of the present invention. First, for example, in order to reduce the complexity of the receivers 100 and 200, it may be desirable to use MMSE equalization only in the first iteration (LFE 105 and 210). Filters used in the second through $m^{th}$ iterations or stages (such as LFE 145, 260A, 260B, and so on) can be replaced with a matched filter, such as $f^*(z^{-1})$. This is particularly useful because in the latter iterations, as more of the signal transmitted from the serving site is subtracted, the MMSE receiver will converge to such a matched filter (or the whitened-matched filter in the case of non-white other-cell interference and noise.)

Second, interference from pilot codes and symbols can be easily estimated and subtracted. If the MMSE equalizers in the first and subsequent stages (LFE 105 and 210, and LFE 145, 260A through 260M) are implemented adaptively, multiple-access interference due to the pilot code and symbols should be subtracted after the MMSE equalizer and prior to the code channel correlators (110 and 225A through 225M). If the MMSE equalizers (LFE 105 and 210, and LFE 145, 260A through 260M) are not implemented adaptively, or if the adaptation does not depend on the pilot signals, multiple-access interference from the pilot signals can be subtracted from the received signal prior to the equalization.

Third, equivalent embodiments of the receivers 100 and 200, particularly those compatible with rake architectures, will be readily apparent to those of skill in the art. Referring to FIGS. 1 and 2, the various filters have been illustrated with no constraints on the span or length of the filters. Equivalently, these filters may be implemented with constraints on the span, such as finite impulse response (FIR) filters, and FIR filters having non-uniform tap spacing, such as tap spacing constrained by delays corresponding to rake finger locations.

It should be noted that, in the preferred embodiment, means are provided to selectively turn off the parallel interference cancellation of the present invention, depending upon channel conditions. When the receiver (or mobile station) knows of and is thereby able to cancel a large fraction of users of other channels, such as 75%, then parallel interference cancellation is kept operational. Alternatively, when the receiver does not know or cannot determine the extent of use of other code channels, or may only determine a small fraction of users, such as 25%, then parallel interference cancellation is turned off.

Figure 3:
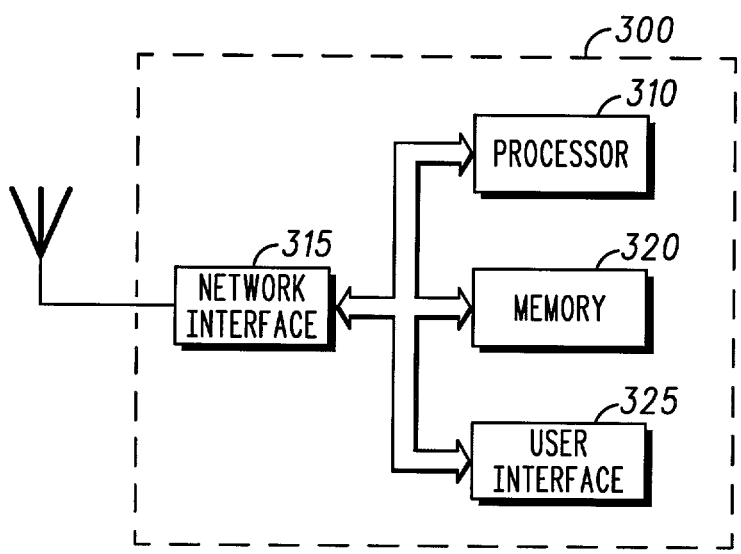
FIG. 3 is a block diagram illustrating an apparatus embodiment of the preferred receiver structure for MMSE equalization with parallel interference cancellation in accordance with the present invention.

FIG. 3 is a block diagram illustrating an apparatus 300 embodiment of the preferred receiver structure for MMSE equalization with parallel interference cancellation in accordance with the present invention. In the preferred embodiment, such an apparatus 300 may be included within a mobile station utilized in a mobile communication system, such as a CDMA, cdma2000, W-CDMA or 3GPP mobile telephone, or included within any multimedia or other communication device utilized within any other direct-sequence spread spectrum communication systems. (Numerous other variations and equivalent embodiments will be readily apparent and are also within the scope of the present invention).

Referring to FIG. 3, the apparatus 300 includes a processor 310, a network interface 315, a memory 320, and a user interface 325. The network interface 315 is utilized to receive and to transmit the signals of the various communication links (legs or paths), and also to receive and transmit messages or other signaling, such as various CDMA requests and responses, e.g., call set up messages and other information messages. Various functions of the present invention, while preferably included within the processor 310 as discussed below, also may be included equivalently within the network interface 315 or equivalently distributed among the network interface 315 and the processor 310. The user interface 325 is utilized for communication with a user or subscriber, and may include visual, audio and electromechanical interfaces, such as a visual display, a microphone, an audio speaker, a keypad or other information entry system, and may be implemented in any manner known in the prior art. The memory 320 may be any type of memory integrated circuit, such as RAM, FLASH, DRAM, SRAM, MRAM, ROM, EPROM or E$^2$PROM, or any other type of memory or data storage apparatus or circuit, depending upon the selected embodiment, such as a magnetic hard drive or an optical storage device. The memory 220 is used to store information pertaining to call placement, call set up, routing information, and configuration or program instructions, as discussed in greater detail below.

Continuing to refer to FIG. 3, the processor 310 may include a single integrated circuit ("IC"), or may include a plurality of integrated circuits or other components connected, arranged or grouped together, such as microprocessors, digital signal processors ("DSPs"), custom ICs, application specific integrated circuits ("ASICs"), field programmable gate arrays ("FPGAs"), associated memory (such as RAM and ROM), and other ICs and components. As a consequence, as used herein, the term processor should be understood to equivalently mean and include a single IC, or arrangement of custom ICs, ASICs, processors, microprocessors, controllers, FPGAs, or some other grouping of integrated circuits which perform the functions discussed above with reference to FIGS. 1–2, and also discussed below with reference to FIG. 4, with associated memory, such as microprocessor memory or additional RAM, DRAM, SRAM, MRAM, ROM, EPROM or E$^2$PROM. The processor 310 with its associated memory may be configured (via programming, FPGA interconnection, or hard-wiring) to perform the methodology of the invention, as discussed above with reference to FIGS. 1–2 and as discussed below with reference to FIG. 4. For example, the methodology may be programmed and stored, in the processor 310 with its associated memory (and/or memory 320) and other equivalent components, as a set of program instructions (or equivalent configuration or other program) for subsequent execution when the processor 310 is operative (i.e., powered on and functioning). Equivalently, when the processor 310 with its associated memory and other equivalent components are implemented in whole or part as FPGAs, custom ICs and/or ASICs, the FPGAs, custom ICs or ASICs also may be designed, configured and/or hard-wired to implement the methodology of the invention. In the preferred embodiment, the processor 310 is implemented as an arrangement of microprocessors, DSPs and/or ASICs, which are respectively programmed, designed or configured to implement the methodology of the invention. As indicated above, various functions of the present invention, while preferably included within the processor 310, also may be included equivalently within the network interface 315 or equivalently distributed among the network interface 315 and the processor 310.

Figure 4A:
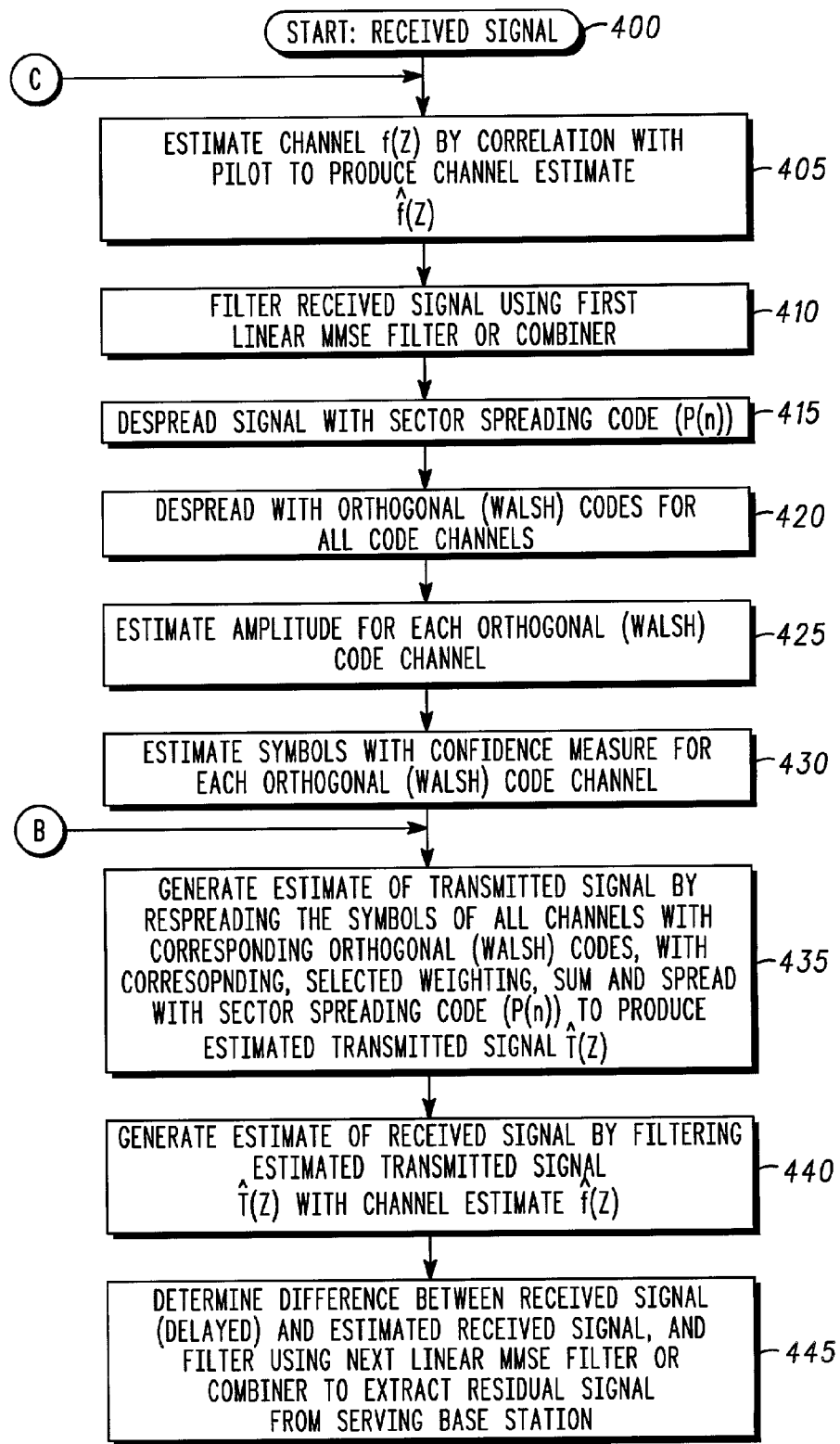
FIG. 4 (divided into FIGS. 4A and 4B) is a flow diagram illustrating a method embodiment for MMSE equalization with parallel interference cancellation in accordance with the present invention.
Figure 4B:
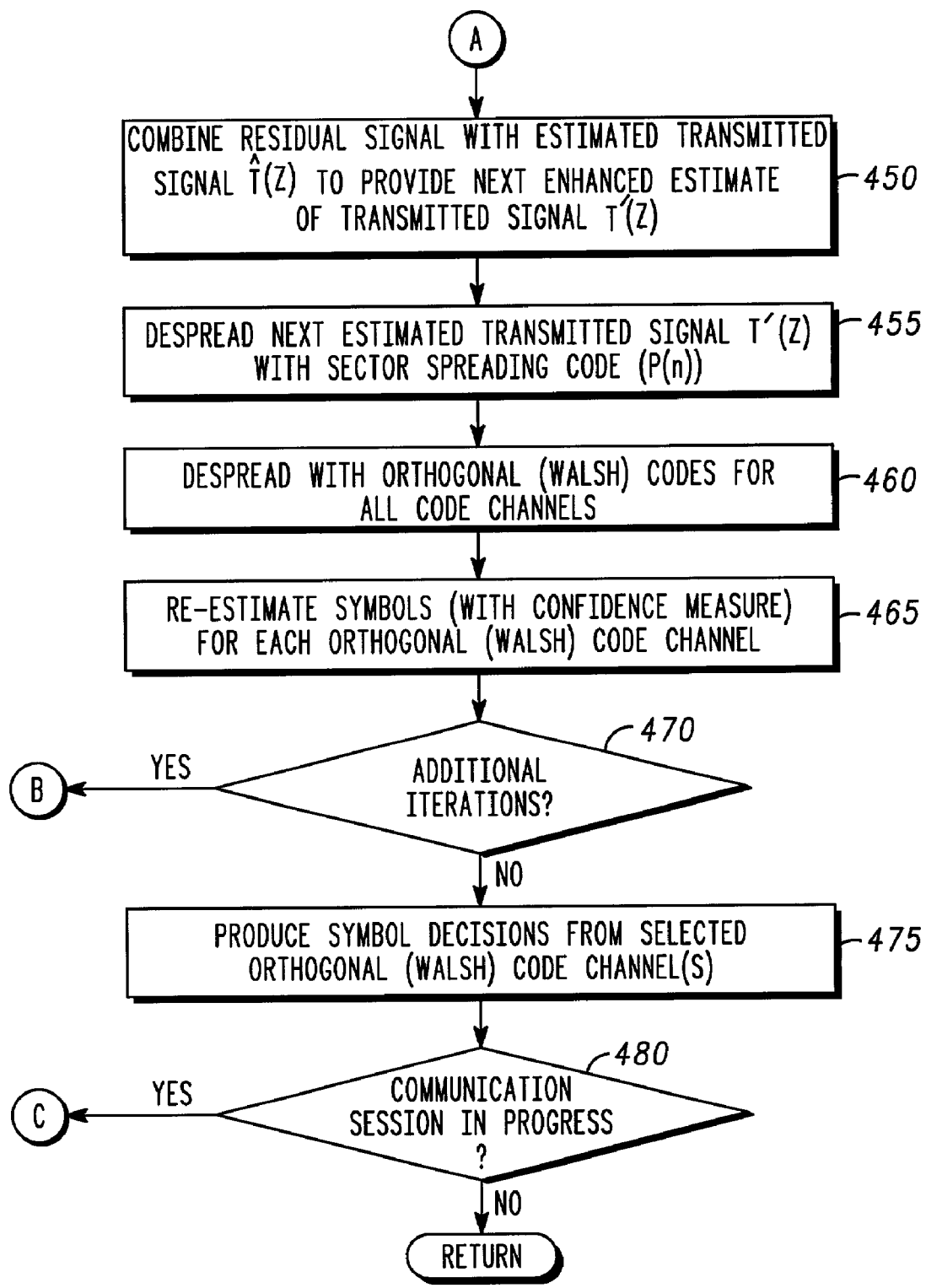

FIG. 4 is a flow diagram illustrating a method embodiment for MMSE equalization with parallel interference cancellation in accordance with the present invention, and provides a useful summary. The method begins with a received signal, start step 400, such as a signal appearing on an antenna portion of the network interface 315. In step 405, the channel f(z) is estimated, preferably by correlation with a pilot signal, to produce a channel estimate (used subsequently in step 440). The received signal is filtered, preferably using a first linear MMSE equalizer, which may be implemented in various ways, as discussed above, step 410. The MMSE filtered signal is then despread (and possibly gain adjusted), first despreading the signal with a sector spreading code (step 415), followed by despreading with all orthogonal (Walsh) codes for all channels in use (step 420). Amplitude estimates are also made for each orthogonal code channel, step 425, and symbols are estimated (with corresponding confidence or reliability determinations) for each orthogonal code channel, step 430.

Continuing to refer to FIG. 4, in step 435, an estimate of the transmitted signal is generated, by respreading the estimated symbols of all channels with corresponding orthogonal (Walsh) codes, with corresponding weighting (from confidence determinations), summed, and spread with the selected sector spreading code, to produce an estimated transmitted signal. The estimated transmitted signal is then filtered, using the channel estimate (determined previously in step 405), to generate an estimated received signal, step 440. For multiple-access interference (or other parallel interference) cancellation, the difference is determined between the received signal (appropriately delayed) and the estimated received signal, preferably by subtracting the estimated received signal from a delayed version of the received signal, and the resulting difference is filtered, preferably by a second linear MMSE equalizer or matched filter or combiner, to extract a residual signal from the serving base station, step 445. As this interference cancellation also removed the desired signals, the residual signal is combined with the estimated transmitted signal to produce a second or next (and enhanced) estimated transmitted signal, step 450.

Using the second, enhanced estimated transmitted signal, enhanced symbol estimates are made. The second (or next) estimated transmitted signal is despread, first despreading the sector spreading code, step 455, followed by despreading the orthogonal (Walsh) codes for all code channels in use, step 460. Symbols are then re-estimated, with confidence determinations, for all channels, step 465. When no further or additional iterations are to be performed using these next, re-estimated symbol determinations in step 470, as in the preferred embodiment, the symbols from the one or more selected orthogonal code channels are produced or otherwise output for further use, step 475. In other embodiments, when further or additional iterations are to be performed using these next, re-estimated symbol determinations, step 470, the method proceeds back to step 435, to generate a next, third estimated transmitted signal (and so on, for each next iteration). Following the output of symbol decisions in step 475, while the communication session is in progress, step 480, the method continues, returning to step 405 for ongoing processing of the received signal. When the communication session is no longer in progress in step 480, the method may end, return step 485.

Numerous advantages of the present invention are readily apparent. Use of the linear MMSE equalization with parallel and iterative interference cancellation of the present invention provides significantly increased performance. Utilizing the present invention, base station transceivers may transmit using significantly lower power allocations, increasing the number of users who may be served and increasing the amount of data which may be transmitted for existing users. The use of the present invention also solves numerous problems of the prior art. Prior art attempts to use parallel interference cancellation in the forward link of CDMA-type systems have suffered from catastrophic failure.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

What is claimed is:

1. A method of symbol determination in a direct sequence spread spectrum multiple access communication system having a plurality of code channels in use, the method comprising:
   (a) linearly filtering a received signal to form a first filtered signal;
   (b) despreading the first filtered signal and providing a plurality of symbol estimates for all corresponding code channels of the plurality of code channels;
   (c) generating an estimated transmitted signal from the plurality of symbol estimates;
   (d) generating an estimated received signal from the estimated transmitted signal and a channel estimate;
   (e) producing a residual signal as a difference between the received signal and the estimated received signal;
   (f) linearly filtering the residual signal to form a second filtered signal;
   (g) combining the second filtered signal with the estimated transmitted signal to form a next estimated transmitted signal; and
   (h) despreading the next estimated transmitted signal and providing a next plurality of symbol estimates for a selected code channel of the plurality of code channels.

2. The method of claim 1, wherein the linear filtering of step (a) further comprises minimum mean square error feedforward equalization.

3. The method of claim 2, wherein a plurality of coefficients of the minimum mean square error feedforward equalization are adaptive to an error determined from the received signal and a known pilot signal.

4. The method of claim 3, wherein the plurality of coefficients are adaptive using a least mean square algorithm.

5. The method of claim 3, wherein the plurality of coefficients are adaptive using a recursive least squares algorithm.

6. The method of claim 2, wherein a plurality of coefficients of the minimum mean square error feedforward equalization are directly computed from the channel estimate and an estimate of channel geometry.

7. The method of claim 2, wherein a plurality of coefficients of the minimum mean square error feedforward equalization are determined from an estimate of a correlation matrix of the received signal and an estimate of a channel mean.

8. The method of claim 1, wherein the linear filtering of step (a) further comprises multiple stage Weiner filtering.

9. The method of claim 1, wherein the linear filtering of step (f) further comprises minimum mean square error feedforward equalization.

10. The method of claim 1, wherein the linear filtering of step (f) further comprises matched filtering.

11. The method of claim 1, wherein step (b) further comprises generating an amplitude estimate for all corresponding code channels of the plurality of code channels and generating a confidence measure for each symbol estimate of the plurality of symbol estimates.

12. The method of claim 11, wherein generating the estimated transmitted signal of step (c) further comprises:
   weighting each symbol estimate by its corresponding confidence measure to form a plurality of weighted symbols; and
   spreading the plurality of weighted symbols using a corresponding plurality of orthogonal codes, a corresponding plurality of amplitude estimates, and a sector spreading code.

13. The method of claim 1, wherein step (d) further comprises:
   generating the channel estimate by correlation of the received signal with a known pilot signal.

14. The method of claim 1, further comprising:
   iteratively repeating steps (c) through (g) until a selected level of accuracy is obtained.

15. An apparatus for symbol determination in a direct sequence spread spectrum multiple access communication system having a plurality of code channels in use, the apparatus comprising:
   first means for linearly filtering a received signal to form a first filtered signal;
   means for despreading the first filtered signal and providing a plurality of symbol estimates for all corresponding code channels of the plurality of code channels;

means for generating an estimated transmitted signal from the plurality of symbol estimates;

means for generating an estimated received signal from the estimated transmitted signal and a channel estimate;

means for producing a residual signal as a difference between the received signal and the estimated received signal;

second means for linearly filtering the residual signal to form a second filtered signal;

means for combining the second filtered signal with the estimated transmitted signal to form a next estimated transmitted signal; and means for despreading the next estimated transmitted signal and providing a next plurality of symbol estimates for a selected code channel of the plurality of code channels.

16. The apparatus of claim 15, wherein the first means for linear filtering further comprises means for minimum mean square error feedforward equalization.

17. The apparatus of claim 16, wherein a plurality of coefficients of the means for minimum mean square error feedforward equalization are adaptive to an error determined from a received signal and a known pilot signal.

18. The apparatus of claim 17, wherein the plurality of coefficients are adaptive using a least mean square algorithm.

19. The apparatus of claim 17, wherein the plurality of coefficients are adaptive using a recursive least squares algorithm.

20. The apparatus of claim 16, wherein a plurality of coefficients of the means for minimum mean square error feedforward equalization are directly computed from a channel estimate and an estimate of channel geometry.

21. The apparatus of claim 16, wherein a plurality of coefficients of the means for minimum mean square error feedforward equalization are determined from an estimate of a correlation matrix of the received signal and an estimate of a channel mean.

22. The apparatus of claim 15, wherein the first means for linear filtering further comprises means for multiple stage Weiner filtering.

23. The apparatus of claim 15, wherein the second means for linear filtering further comprises means for minimum mean square error feedforward equalization.

24. The apparatus of claim 15, wherein the second means for linear filtering further comprises means for matched filtering.

25. The apparatus of claim 15, wherein the means for despreading the first filtered signal and providing a plurality of symbol estimates for all corresponding channels of the plurality of channels further comprises means for generating an amplitude estimate for all corresponding code channels of the plurality of code channels and means for generating a confidence measure for each symbol estimate of the plurality of symbol estimates.

26. The apparatus of claim 25, wherein means for generating the estimated transmitted signal further comprises:

means for weighting each symbol estimate by its corresponding confidence measure to form a plurality of weighted symbols; and means for spreading the plurality of weighted symbols using a corresponding plurality of orthogonal codes, a corresponding plurality of amplitude estimates, and a sector spreading code.

27. The apparatus of claim 15, wherein the means for generating an estimated received signal from the estimated transmitted signal and a channel estimate further comprises means for generating the channel estimate by correlation of the received signal with a known pilot signal.

28. An apparatus for symbol determination in a direct sequence spread spectrum multiple access communication system having a plurality of code channels in use, the apparatus comprising:

a network interface for communication with a serving base station;

a memory; and a processor coupled to the network interface and to the memory, wherein the processor when operative is configured to linearly filter a received signal to form a first filtered signal, to despread the first filtered signal and provide a plurality of symbol estimates for all corresponding code channels of the plurality of code channels; to generate an estimated transmitted signal from the plurality of symbol estimates, to generate an estimated received signal from the estimated transmitted signal and a channel estimate and to produce a residual signal as a difference between the received signal and the estimated received signal; and the processor further configured to linearly filter the residual signal to form a second filtered signal, to combine the second filtered signal with the estimated transmitted signal to form a next estimated transmitted signal, and to despread the next estimated transmitted signal and provide a next plurality of symbol estimates for a selected code channel of the plurality of code channels.

29. The apparatus of claim 28, wherein the processor is further configured to perform linear filtering utilizing minimum mean square error feedforward equalization.

30. The apparatus of claim 29, wherein the processor is further configured to adapt a plurality of coefficients using minimum mean square error feedforward equalization with adaptation to an error determined from the received signal and a known pilot signal.

31. The apparatus of claim 30, wherein the processor is further configured to adapt the plurality of coefficients using a least mean square algorithm.

32. The apparatus of claim 30, wherein the processor is further configured to adapt the plurality of coefficients using a recursive least squares algorithm.

33. The apparatus of claim 29, wherein the processor is further configured to directly compute a plurality of coefficients from a channel estimate and an estimate of channel geometry, for minimum mean square error feedforward equalization.

34. The apparatus of claim 29, wherein the processor is further configured to determine a plurality of coefficients from an estimate of a correlation matrix of the received signal and an estimate of a channel mean, for minimum mean square error feedforward equalization.

35. The apparatus of claim 28, wherein the processor is further configured to perform linear filtering as multiple stage Weiner filtering.

36. The apparatus of claim 28, wherein the processor is further configured to generate an amplitude estimate for all corresponding code channels of the plurality of code channels and generate a confidence measure for each symbol estimate of the plurality of symbol estimates.

37. The apparatus of claim 28, wherein the processor is further configured to generate the estimated transmitted signal by weighting each symbol estimate by its corresponding confidence measure to form a plurality of weighted symbols, and to spread the plurality of weighted symbols using a corresponding plurality of orthogonal codes, a corresponding plurality of amplitude estimates, and a sector spreading code.

38. The apparatus of claim 28, wherein the processor is further configured to generate the channel estimate by correlation of the received signal with a known pilot signal.

39. A method of symbol determination in a code division multiple access communication system having a plurality of code channels in use, the method comprising:

equalizing a received signal, using minimum mean square error equalization, to form a first filtered signal;

despreading the first filtered signal and providing a plurality of symbol estimates for all corresponding code channels of the plurality of code channels;

generating an amplitude estimate for all corresponding code channels of the plurality of code channels and generating a confidence measure for each symbol estimate of the plurality of symbol estimates;

generating an estimated transmitted signal from the plurality of symbol estimates by weighting each symbol estimate by its corresponding confidence measure to form a plurality of weighted symbols, and spreading the plurality of weighted symbols using a corresponding plurality of orthogonal codes, a corresponding plurality of amplitude estimates, and a sector spreading code;

generating an estimated received signal from the estimated transmitted signal and a channel estimate determined by correlation of the received signal with a known pilot signal;

producing a residual signal as a difference between the received signal and the estimated received signal;

equalizing the residual signal, using minimum mean square error equalization, to form a second filtered signal;

combining the second filtered signal with the estimated transmitted signal to form a next estimated transmitted signal; and despreading the next estimated transmitted signal to form a next despread signal and, using the next despread signal, providing a next plurality of symbol estimates for a selected code channel of the plurality of code channels.

40. An apparatus for symbol determination in a code division multiple access communication system having a plurality of code channels in use, the apparatus comprising:

a first linear equalizer, the first linear equalizer operative to equalize a received signal, using minimum mean square error equalization, to form a first filtered signal;

a code despreader coupled to the first linear equalizer, the code despreader operative to despread the first filtered signal to produce a despread signal;

an amplitude estimator coupled to the code despreader, the amplitude estimator operative to generate an amplitude estimate for all corresponding code channels of the plurality of code channels;

a symbol decider coupled to the code despreader, the symbol decider operative to provide a plurality of symbol estimates from the despread signal for all corresponding code channels of the plurality of code channels and to generate a confidence measure for each symbol estimate of the plurality of symbol estimates;

a transmitted signal estimator coupled to the symbol decider and to the amplitude estimator, the transmitted signal estimator operative to generate an estimated transmitted signal from the plurality of symbol estimates by weighting each symbol estimate by its corresponding confidence measure to form a plurality of weighted symbols, and to spread the plurality of weighted symbols using a corresponding plurality of orthogonal codes, a corresponding plurality of amplitude estimates, and a sector scrambling code;

a channel estimator operative to determine a channel estimate by correlation of the received signal with a known pilot signal;

a received signal estimator coupled to the transmitted signal estimator and to the channel estimator, the received signal estimator operative to generate an estimated received signal from the estimated transmitted signal and the channel estimate;

a summer coupled to the received signal estimator, the summer operative to produce a residual signal as a difference between the received signal and the estimated received signal;

a second linear equalizer coupled to the summer, the second linear equalizer operative to equalize the residual signal, using minimum mean square error equalization, to form a second filtered signal;

a combiner coupled to the second linear equalizer, to the transmitted signal estimator, and to the code despreader, the combiner operative to combine the second filtered signal with the estimated transmitted signal to form a next estimated transmitted signal; and wherein the code despreader is further operative to despread the next estimated transmitted signal to form a next despread signal and, using the next despread signal, the symbol decider is further operative to provide a next plurality of symbol estimates for a selected channel of the plurality of channels.

\* \* \* \* \*